US008042000B2

(12) United States Patent
Birch et al.

(10) Patent No.: US 8,042,000 B2
(45) Date of Patent: Oct. 18, 2011

(54) APPARATUS, SYSTEM, AND METHOD FOR VALIDATING APPLICATION SERVER REPLICATION ERRORS

(75) Inventors: Oliver Birch, Annapolis, MD (US); Can P. Boyacigiller, Annapolis, MD (US); Christopher Dacombe, Ellicott City, MD (US); Sreenivasa R. Pamidala, Crofton, MD (US); Bouna Sall, Bowie, MD (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/427,490

(22) Filed: Apr. 21, 2009

(65) Prior Publication Data

US 2010/0268991 A1    Oct. 21, 2010

(51) Int. Cl.
*G06F 11/00* (2006.01)
(52) U.S. Cl. ............. 714/32; 714/4.11; 714/6.3; 714/11
(58) Field of Classification Search ............. 714/4, 6, 714/11, 32, 33, 42, 43, 54, 4.1, 4.11, 6.3
See application file for complete search history.

(56) References Cited

U.S. PATENT DOCUMENTS

| | | | | |
|---|---|---|---|---|
| 6,625,751 | B1 * | 9/2003 | Starovic et al. | 714/11 |
| 2004/0230863 | A1 * | 11/2004 | Buchhorn | 714/6 |
| 2006/0053305 | A1 * | 3/2006 | Wahlert et al. | 713/189 |
| 2007/0268930 | A1 * | 11/2007 | Bond et al. | 370/467 |
| 2008/0155310 | A1 * | 6/2008 | Langen et al. | 714/6 |
| 2008/0270596 | A1 * | 10/2008 | Wahl | 709/224 |
| 2009/0063893 | A1 * | 3/2009 | Bagepalli et al. | 714/4 |

OTHER PUBLICATIONS

Carr, "Softswitches Make 'Stupid' Network Ring", EE Times, http://www.eetimes.com/story/OEG20010925S0066, Sep. 25, 2001.

* cited by examiner

*Primary Examiner* — Robert Beausoliel, Jr.
*Assistant Examiner* — Joseph D Manoskey
(74) *Attorney, Agent, or Firm* — Kunzler Needham Massey & Thorpe

(57) ABSTRACT

An apparatus, system, and method are disclosed for validating application server replication errors. The method includes receiving a first information message with a test sequence from a caller. The caller is engaged in a communication session with a callee according to a communication protocol and the communication session is managed by a first application server. The method also includes storing the test sequence in a replicable data structure on the first application server. The replicable data structure is replicated to a second application server to form a replicated data structure and both servers operate within an active-active configuration. The method also includes receiving a second information message from the caller. The second information message includes a confirmation sequence. In addition, the method includes determining a replication error in response to comparing the stored test sequence in the replicated data structure with the confirmation sequence.

20 Claims, 6 Drawing Sheets

APPARATUS, SYSTEM, AND METHOD FOR VALIDATING APPLICATION SERVER REPLICATION ERRORS

FIELD OF THE INVENTION

This invention relates to application servers and more particularly relates to validating application server replication errors.

BACKGROUND

Description of the Related Art

The Session Initiation Protocol ("SIP") is a communication protocol often used for initiating, managing, and terminating multimedia communication sessions. Many service providers mandate that SIP application server vendors meet stricter carrier grade requirements for their SIP application servers. The majority of SIP application servers in the market provide at a minimum, high availability features that are prerequisites to meet these carrier grade requirements. Typically, high availability is achieved through a replication mechanism in the application server that replicates the SIP application session state data associated with each communication session/link to one or more peer application servers. In case of failure of the primary application server, a peer application server with the replicated session state data assumes management of the communication session/link.

Typically, this replication is performed on a "best effort" basis, providing no confirmation when the data replication is completed. In order to independently validate that the application session state data on an application server was successfully replicated without relying on reporting capabilities of a product, a test methodology is required to detect and validate an application session state replication failure on a peer application server either due to a corruption of the session data or when the session data failed to replicate to a peer application server.

One solution is to report a replication failure when the application session data is not available on the peer application server. However, in certain circumstances, the replication function may be functional and the application session data may have been replicated to the peer application server, but the data consistency for the application session data may be incorrect.

Another solution involves analyzing the failed calls by looking at the number of calls generated by the caller, referred to as the User Agent Client ("UAC"), calls handled by the application servers, calls received by the callee, or User Agent Server ("UAS"), and by looking at the log files of the three elements (UAC, UAS and application servers). However, this analysis may require a great deal of logging and correlation. Also, this analysis is a laborious task when there are large numbers of call failures for a given fault insertion and for environments where the system under test has a large number of servers. Furthermore, each of the above methods relies on the reporting capabilities of the product which may be inadequate to clearly identify if replication errors have occurred.

BRIEF SUMMARY

The present invention has been developed to provide an apparatus, system, and method for validating application server replication errors.

The method for validating application server replication errors includes receiving a first information message comprising a test sequence, storing the test sequence in a replicable data structure, receiving a second information message comprising a confirmation sequence, comparing the stored test sequence, and determining a replication error.

In one embodiment, the method includes receiving a first information message from a caller. The information message includes a test sequence. The caller is engaged in a communication session with a callee according to a communication protocol and the communication session is managed by a first application server. The method also includes storing the test sequence in a replicable data structure on the first application server. The replicable data structure is replicated to a second application server to form a replicated data structure. The first application server and the second application server operate within an active-active configuration. The method also includes receiving a second information message from the caller. The second information message includes a confirmation sequence. In addition, the method includes comparing the stored test sequence in the replicated data structure with the confirmation sequence. The method also includes determining a replication error in response to the comparison of the stored test sequence to the confirmation sequence.

In one embodiment, determining a replication error further includes determining the replication error in response to the stored test sequence in the replicated data structure failing to match the confirmation sequence. The method may include logging the replication error in an error log in response to the stored test sequence in the replicated data structure failing to match the confirmation sequence. In one embodiment, determining a replication error includes determining the replication error in response to determining that the stored test sequence is absent from the second application server. The method may include logging a replication error in an error log in response to determining that the stored sequence is absent from the second application server.

In some embodiments, the method includes injecting an application server failure that causes the first application server to fail. The second application server assumes management of the communication session in response to the first application server failing. Furthermore, in one embodiment, the communication protocol is SIP and each of the first application server and the second application server are running a Back-to-Back User Agent ("B2BUA") application that manages a communication session.

A computer program product comprising a computer readable storage medium having computer readable program code to execute operations is presented for validating application server replication errors. The computer program product may include operations to perform similar steps as described above in relation to the method. In addition, the information message may comprise an SIP INFO message, the method may include receiving a SIP BYE message that ends the communication session, the caller may comprise a user agent client ("UAC"), and the callee may comprise a user agent server ("UAS").

The apparatus for validating application server replication errors is also provided. These modules in the described embodiments include an information module, a storage module, a termination module, and a determination module. The apparatus may also include a logging module and an injection module. The modules of the apparatus may be configured to functionally perform the necessary steps as described above in relation to the method and the computer program product. In one embodiment, the SIP INFO message is transmitted by a message module in response to a test initiation. In another embodiment, the storage module stores the test sequence in an application session object replicated to the second application server to form a replicated application session object.

A computer program product is also presented for validating SIP server replication errors. The computer program product includes operations to perform similar steps as described above in relation to the method and apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
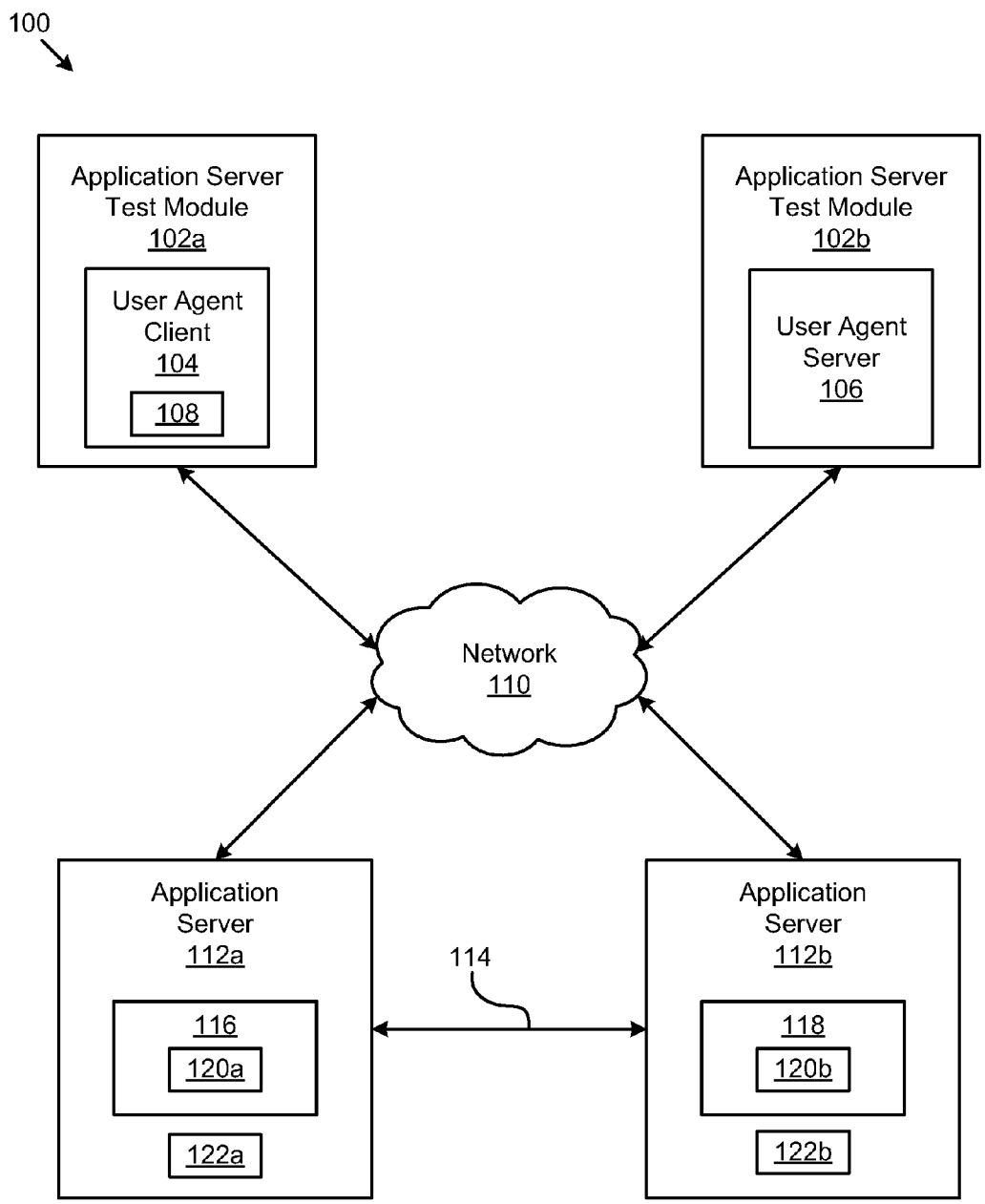
FIG. 1 is a schematic block diagram illustrating one embodiment of a system for validating application server replication errors.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and maybe embodied in any suitable form and organized within any suitable type of data structure. The operational data may be collected as a single data set, or may be distributed over different locations including over different storage devices. Where a module or portions of a module are implemented in software, the software portions are stored on one or more computer readable storage media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of storing machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of a system 100 for validating application server replication errors. The system 100 includes an application server test module 102a with a user agent client ("UAC") 104 and an application server test module 102b with a user agent server ("UAS") 106. The UAC 104 includes a message module 108. Furthermore, the system 100 also includes a network 110 in communication with each application server test module 102a, b and in communication with two or more application servers 112a, b. A first application server 112a includes a replicable data structure 116 with a test sequence 120a. A second application server 112b includes a replicated data structure 118 with a replicated copy of the test sequence 120b. In addition, each application server 112 includes an error validation apparatus 122, and the application servers 112 operate in an active-active configuration 114. Those of skill in the art recognize that the system 100 maybe simpler or more complex than illustrated, so long as the system 100 includes modules or sub-systems that correspond to those described herein.

The application server test module 102, in one embodiment, may be implemented with software and hardware or implemented with software or hardware alone. The application server test module 102 may comprise an electronic device such as a workstation, a computer system, an appliance, an application-specific integrated circuit ("ASIC"), a Personal Digital Assistant ("PDA"), a server, a server blade center, a server farm, a router, a switch, or the like. Furthermore, the application server test module 102 may comprise a software application running on one or more electronic devices similar to those described above.

The depicted embodiment illustrates two application server test modules 102a, b, the first application server test module 102a including a UAC 104 and the second application server test module 102b including a UAS 106. However, one of ordinary skill in the art realizes that a single application server test module 102 may include both the UAC 104 and the UAS 106.

In one embodiment, the application server test module 102 initiates a plurality of communication sessions according to a communication protocol. The communication protocol may include such communication protocols as Session Initiation Protocol ("SIP"), Hypertext Transfer Protocol ("HTTP"), Transaction Capabilities Application Protocol ("TCAP"), and other protocols supported by redundant application servers. Furthermore, the communication protocol may also include integrated communication protocols such as those running on a Converged Application Server as described below.

As used herein, a communication session includes a call, communication link, or other data stream according to a communication protocol such as SIP. The communication sessions initiated by the application server test module 102 may comprise simulated SIP sessions as part of one or more test cases for testing purposes.

In SIP, a user agent creates or receives a SIP message. Furthermore, a UAC 104 initiates a SIP communication and sends requests, and a UAS 106 receives the requests from the UAC 104 and returns responses to the UAC 104. Therefore, the UAC 104 is the "caller" and the UAS 106 is the "callee."

The UAC 104 may include a message module 108 that transmits an information message from the UAC 104. The information message may comprise a SIP INFO message. A SIP INFO message is a pre-existing method used to send data during an ongoing session. In one embodiment, the SIP INFO message transmitted from the message module 108 includes a test sequence 120 integrated into the data message. Furthermore, the test sequence 120 may comprise a string of randomly selected digits used for later comparison as described below.

In addition, the message module 108 inserts a confirmation sequence into another information message or a termination message sent from the UAC 104. The termination message may comprise a SIP BYE message, which is a pre-existing method used to end a communication session. The message module 108 ensures that the confirmation sequence comprises a string of digits identical to the test sequence transmitted in the SIP INFO message.

The network 110 may comprises a LAN, a plurality of LANs, a localized network, the Internet, or other similar network. In another embodiment, the network 110 may be a communication bus or direct cable connection such as a serial or parallel cable connection.

The application servers 112 process SIP communication which includes hosting and managing SIP communication sessions. The application servers 112 may be Converged Application Servers, which allow various communication protocols to interact and share session data. For example, in the WebSphere® Application Server from International Business Machines ("IBM"), the Web container and SIP container may be integrated, or converged, thus able to share session management information.

Each application server 112 may store a data structure 116 that is replicated to other application servers 112. In the depicted embodiment, the first application server 112a includes a replicable data structure 116 and the second application server 112b includes a replicated data structure 118. The replicable data structure 116 may be replicated from the first application server 112a to the second application server 112b forming the replicated data structure 118. In one embodiment, the replicable data structure 116 comprises an application session object and the replicated data structure 118 comprises a replicated application session object, or copy of the application session object.

The application session object includes session state data for managing an active session as is known by one in the art. Those of skill in the art recognize that other data structures besides the application session object may be used to store the session state data. Furthermore, in one embodiment, each application server 112 stores a current, real-time copy of the replicated data structures of other application servers 112. Therefore, changes in the replicable data structure 116 on the first application sever 112a may be reflected in the replicated data structure 118 on the second application server 112b in real time. If the replicable data structure 116 and the replicated data structure 118 are application session objects, changes in the application session on the application server 112 managing the communication session may require the copy of the application session object on other application servers to be updated to stay current.

The replicable data structure 116 stores a test sequence 120a. As described in further detail below, the test sequence 120a in the replicable data structure 116 may be replicated as the replicable data structure 116 is replicated to the second application server 112b as a replicated data structure 118. Likewise, the replicated data structure 118 stores a copy of the test sequence 120b, or a replicated test sequence.

Although the depicted embodiment shows two application servers 112a, b, more than two application servers 112 maybe used in the system 100. The system 100 uses a plurality of application servers 112 to operate in order to provide a high availability configuration. As known by one of ordinary skill in the art, high availability is provided by way of server redundancy so that service will not be interrupted in circumstances in which one or more application servers 112 fail. In addition, the applications servers 112 may operate within an active-active configuration 114, meaning that each application server 112 actively processes communication traffic, each application server 112 may assume the communication sessions of another application server 112 in case that application server fails, and each application server 112 may send and receive data for replication. Specifically, replicating the application session object allows the second application server 112b to assume management of the communication session associated with the application session object in case the first application server fails 112a.

An application server 112 may be implemented with software and hardware or implemented with software or hardware alone. The application server 112 may comprise an electronic device such as a workstation, a computer system, an appliance, an ASIC, a PDA, a server, a server blade center, a server farm, a router, a switch, or the like. One of skill in the art will recognize other examples of electronic devices that may serve as the application server 112. The application server 112 may include a system bus, a processor, a system memory, and one or more memory storage devices. Furthermore, the application server 112 may comprise a software application running on one or more electronic devices similar to those described above. In one embodiment, each application server 112 comprises or hosts a Back-to-Back User Agent ("B2BUA") application to process and manage a SIP communication session. In another embodiment, the B2BUA application runs on an IBM WebSphere® Application Server.

The error validation apparatus 122 provides a lightweight mechanism to independently detect, validate, and determine replication errors involving data replicated between the redundant application servers 112a, b. Furthermore, the error validation apparatus 122 uses existing SIP communication methods and determines both inconsistencies with data that has been replicated and replication failure when data fails to replicate at all. In addition, the error validation apparatus 122 is an independent validation of the data replication that does not rely on the information in application server vendor reports from the application server log files.

The error validation apparatus 122 is useful for testing SIP application servers 112 in high availability configurations in which data is replicated between servers. Specifically, the error validation apparatus 122 may be used to test application servers 112 under different failure, recovery, and load conditions. Moreover, the error validation apparatus 122 may also aid an application server vendor in meeting strict carrier grade requirements that require proof that even if "best effort" replication is being used, that the replication is not failing. As mentioned above, the error validation apparatus 122 is not limited to testing SIP application servers 112, but may be useful with other communication protocols using high availability application servers 112 or Converged Application Servers.

A user may create test cases to use the error validation apparatus 122 in simulating a plurality of communication sessions. For example, the user may simulate SIP communication under a high load situation with up to 200 calls per second.

A copy of the executable code implementing the error validation apparatus 122, in one embodiment, resides on each application server 112. In another embodiment, the error validation apparatus 122 resides on a common computing device in communication with each application server 112, the Converged Application Server test module, and the like.

Figure 2:
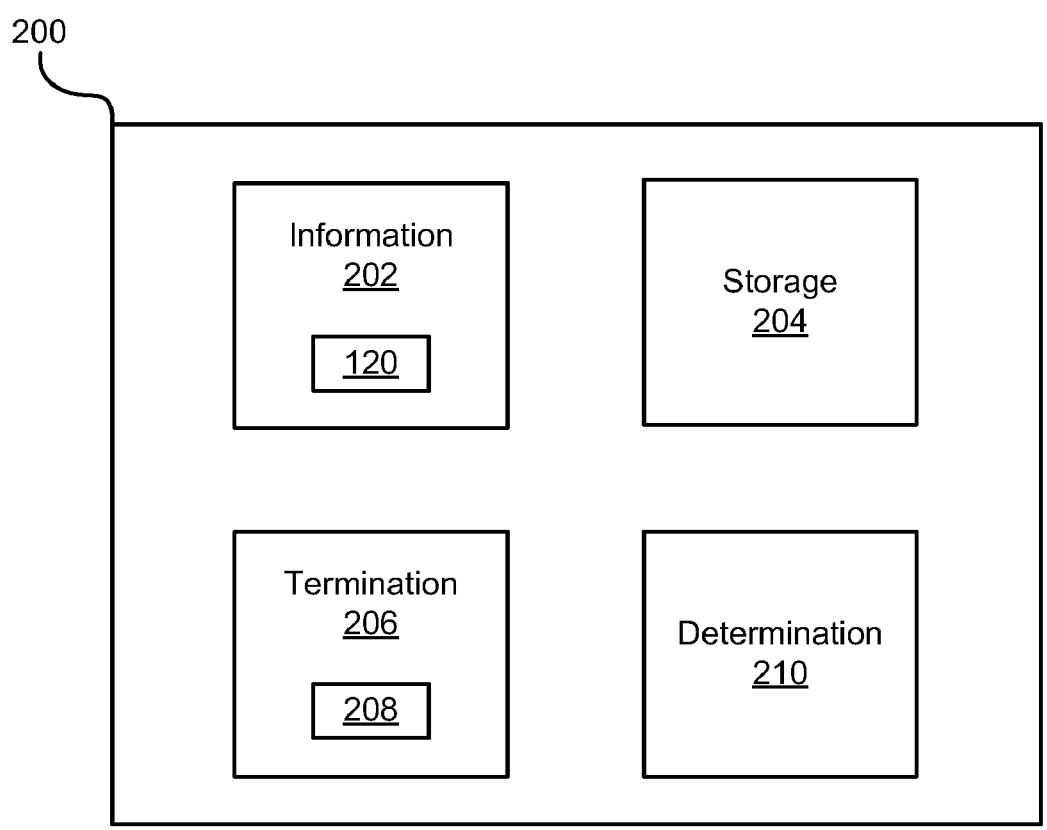
FIG. 2 is a schematic block diagram illustrating one embodiment of an apparatus for validating application server replication errors.

FIG. 2 illustrates one embodiment of an apparatus 200 for validating application server replication errors. The apparatus 200 represents one embodiment of the error validation apparatus 122 in FIG. 1. The apparatus 200 in the pictured embodiment includes an information module 202 with a test sequence 120, a storage module 204, a termination module 206 with a confirmation sequence 208, and a determination module 210.

Referring to FIGS. 1 and 2, the information module 202 receives an INFO message from the UAC 104. The UAC 104 is engaged in a communication session with a UAS 106 according to SIP or another communication protocol. The UAC 104 may include a message module 108 to transmit an information message from the UAC 104. The information message transmitted from the message module 108 may be a message according to any pre-existing method used to send data during an ongoing communication session and may comprise a SIP request message such as a SIP INFO message.

The INFO message may include a test sequence 120 embedded into the body of the SIP INFO message. As stated above, the test sequence 120 may be a string of randomly selected digits in the text body of the SIP INFO message and is similar to the test sequence 120 in FIG. 1. In one embodiment, the message module 108 inserts the test sequence 120 into the SIP INFO message from a file stored in the message module 108 such as an Extended Markup Language ("XML") file. The test sequence 120 may also be machine specific and may comprise a Media Access Control ("MAC") address, Internet Protocol ("IP") address, and the like. The test sequence 120 and the mechanism by which the message module 108 obtains the test sequence 120 may also be user-configurable. The test sequence 120 may further include a communication session identifier to associate the test sequence 120 with the particular communication session for which the message module 108 generated the test sequence 120.

In addition, the message module 108 may transmit the SIP INFO message in response to a test initiation. For example, a user may create a test case designed to automatically initiate several communication sessions over a predetermined period of time. The user may initiate the test, which causes the message module 108 to transmit the SIP INFO message with the test sequence 120.

The storage module 204 stores the test sequence 120 in a replicable data structure 116 on the first application server 112a. The first application server 112a may represent an application server 112 that initially manages a communication session and that includes a replicable data structure 116. The replicable data structure 116 is replicated to a second application server 112b forming a replicated data structure 118. The second application server 112b may represent an application server 112 that does not initially manage a communication link and that obtains a replicated copy 118 of the replicable data structure 116 from the first application server 112a.

In one embodiment, the replicable data structure 116 comprises an application session object and the replicated data structure 118 comprises a replicated copy of the application session object from the first application server 112a, or replicated application session object. Basic session data and user data stored in the application session object may be automatically replicated between application servers 112 when a change is made to the data. Furthermore, an application session object may also be replicated based on several events such as creation of an application session object, modification of an application session object, expiration of a session timer, and the like.

Furthermore, the first application server 112a and the second application server 112b operate within an active-active configuration. Therefore, the first application server 112a and the second application server 112b each store a replicated copy of the application session objects of the other application servers. As a result, while the first application server 112a actively manages the communication session, the second application server 112b may assume management of the communication session if the first application server 112a fails. The replicated copy of the application session object provides enough information for the second application server 112b to handle the communication session if a failover occurs. If the application server 112 managing the communication session fails, all subsequent calls for the failed application server are sent to the peer application server which handles the call based upon the data replicated on each session.

In one embodiment, the termination module 206 receives a second information message from the UAC 104. The second information message maybe generated by the message module 108 in a similar manner as the first information message described above and may also comprise a SIP INFO message. However, instead of a test sequence 120, the second information message may include a confirmation sequence 208 identical to the test sequence 120.

In another embodiment, the confirmation sequence 208 is embedded in a termination message. In this embodiment, the termination module 206 receives a termination message from the UAC 104. The termination message ends the communication session between the UAC 104 and the UAS 106. The termination message may be any pre-existing method used to end a communication session according to a communication protocol and may comprise a SIP BYE message according to the SIP protocol. The BYE message may include the confirmation sequence 208 identical to the test sequence 120 transmitted in the SIP INFO message.

Like the test sequence 120 in the SIP INFO message, the message module 108 may insert the confirmation sequence 208 into the SIP BYE message or second SIP INFO message from a file stored in the message module 108 such as an XML file. The mechanism in which the message module 108 obtains the confirmation sequence 208 may also be user-configurable. The confirmation sequence 208 may have a communication session identifier to associate the confirmation sequence 208 with the particular communication session in which the confirmation sequence 208 was generated. Furthermore, the termination module 206 may temporarily store the confirmation sequence 208 or record the confirmation sequence 208 in a log file for later comparison as described below.

The determination module 210 compares the stored test sequence in the replicated data structure 118 with the confirmation sequence 208. Furthermore, the determination module 210 also determines a replication error in response to the comparison of the stored test sequence in the replicated data structure 118 with the confirmation sequence 208. The replicated data structure 118 is stored on the second application server 112b. In one embodiment, the determination module 210 initiates the replication error determination after the termination module 206 receives the SIP BYE message. In another embodiment, the determination module 210 periodically checks for a confirmation sequence 210 with which the determination module 210 may perform a comparison.

In one embodiment, the determination module 210 determines the replication error in response to the stored test sequence 120b in the replicated data structure 118 failing to match the confirmation sequence 208. For example, the determination module 210 may retrieve a test sequence 120b of "12345" from the replicated data structure 118 stored on the second application server 112, assuming that the replicable data structure 116 on the first application server 112a replicated to the second application server 112b to form the replicated data structure 118. The determination module 210 may retrieve a confirmation sequence 208 of "14352" and compare the test sequence 120b and confirmation sequence 208 to determine whether they match. If the test sequence 120b from the second application server 112b and the confirmation sequence 208 fail to match, the determination module 210 may determine that a replication error has occurred. The test sequence 120b and the confirmation sequence 208 should be identical, because both sequences were identical when transmitted from the UAC 104. Therefore, if the test sequence 120b and the confirmation sequence 208 fail to match, an error occurred during replication of the test sequence 120.

In another embodiment, the determination module 210 determines the replication error in response to determining that the stored test sequence 120b is absent from the replicated data structure 118 on the second application server 112b. In another embodiment, the determination module 210 determines the replication error in response to determining that the replicated data structure 118 is absent from the second application server 112b. If the stored test sequence 120b or entire replicated data structure 118 is absent, both replicable data structure 116 and the stored test sequence 120a failed to replicate to the second application server 112b at all which also indicates a replication error.

Furthermore, if the test sequence 120b exists in the replicated data structure 118 on the second application server 112b and the test sequence 120b matches the confirmation sequence 208, the determination module 210 determines that no replication error has occurred.

Figure 3:
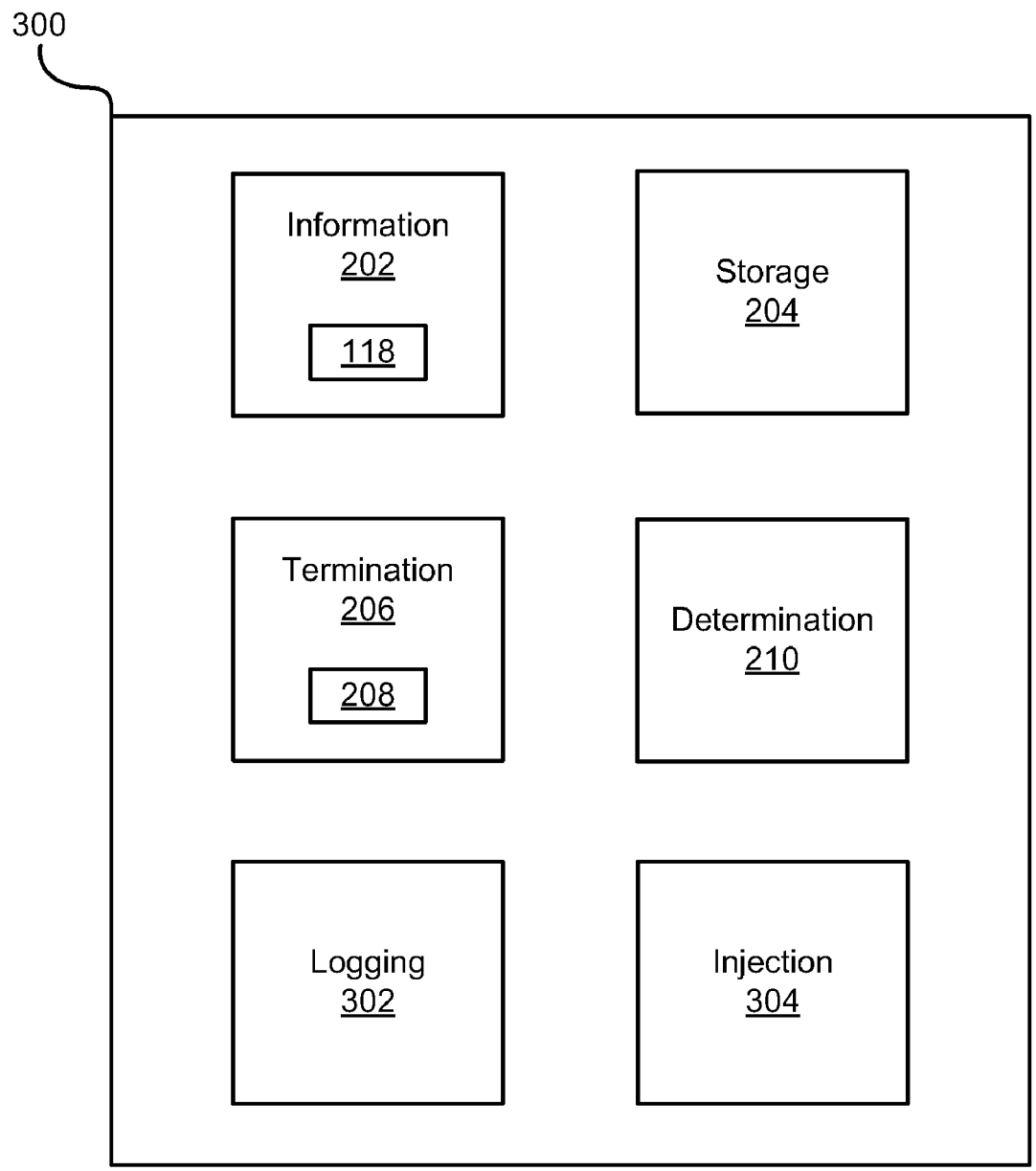
FIG. 3 is a detailed schematic block diagram illustrating another embodiment of an apparatus for validating application server replication errors.

FIG. 3 illustrates another embodiment of an apparatus 300 for validating application server replication errors. The apparatus 300 includes the information module 202 with the test sequence 118, the storage module 204, the termination module 206 with the confirmation sequence 208, and the determination module 210, wherein these modules include substantially the same features as described above in relation to FIG. 2. Additionally, in one embodiment, the apparatus 300 includes a logging module 302 and an injection module 304.

The logging module 302 logs different types of replication errors. Specifically, the logging module 302 may log a replication error in an error log in response to the stored test sequence failing to match the confirmation sequence 208. Specifically, the determination module 210 may signal the logging module 302 to log the replication error that the determination module 210 determined. Furthermore, the logging module 302 may log a replication error in the error log in response to the determination module 210 determining that the stored test sequence 120b is absent from the second application server 112b. In one embodiment, the logging module 302 logs the type of error such as whether the error involves a sequence mismatch or a missing test sequence 120b along with a timestamp and any other information useful in error analysis. Because the logging module 302 only logs errors, the logging module 302 saves resources required to log multiple events. Conversely, a conventional logging system that logs every transaction logs more entries, thereby consuming a greater amount of resources.

The error log may be implemented on a database stored on a computer readable storage medium, stored on a text file, or the like. Furthermore, the logging module 302 may maintain a common error log on a common storage device for each application server 112. In another embodiment, the logging module 302 maintains an error log on each application server 112.

The injection module 304 injects an application server failure that causes an application server 112 to fail so that other application servers 112 will assume management of the communication session of the failed application server. For example, the injection module 304 may cause the first application server 112a to fail such that the second application server 112b may assume management of the communication session in response to the first application server 112a failing. Injecting a failure to cause the first application server 112a to fail ensures that the replicated copy 120b of the stored test sequence 120a is compared with the confirmation sequence 208 to determine replication errors. The injection module 304 may inject failures according to one or more test cases. For example, a test case may instruct the injection module 304 to simulate a server failure after a predetermined number of communication sessions have been initiated, or after a predetermined amount of time. Sample failure insertion tests may include server power failure, network cable failure, network switch failure, network card failure, process failure on server, disk failure, and the like.

Figure 4:
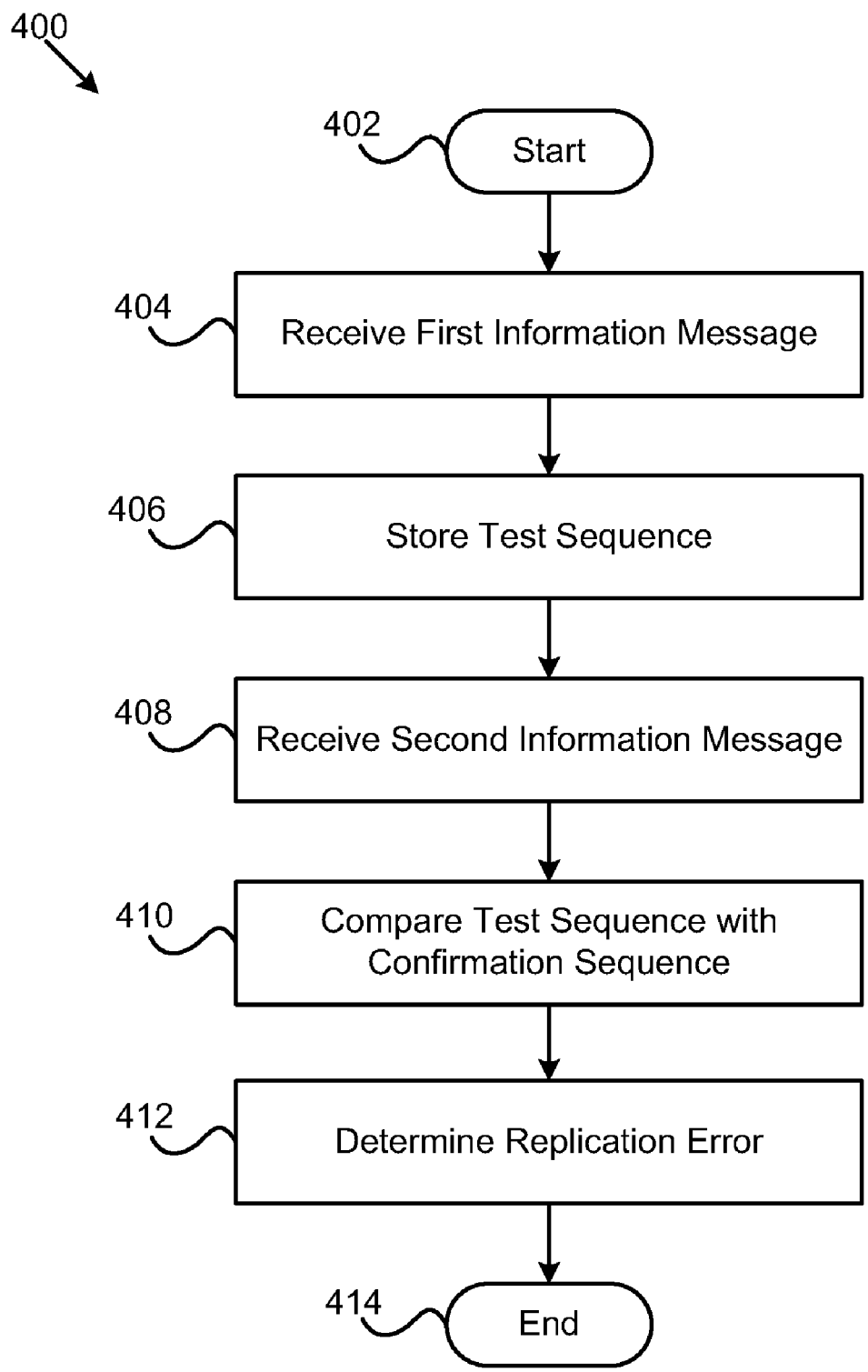
FIG. 4 is a schematic flow chart diagram illustrating one embodiment of a method for validating application server replication errors.

FIG. 4 illustrates one embodiment of a method 400 for validating application server replication errors. The method 400 starts 402 when the information module 202 receives 404 a first information message comprising a test sequence 120 from a caller 104. The caller 104 is engaged in a communication session with a callee 106 according to a communication protocol such as SIP and the communication session is managed by a first application server 112. Next, the storage module 204 stores 406 the test sequence 120 in a replicable data structure 116 on the first application server 112a. The replicable data structure 116 is replicated to a second application server 112b to form a replicated data structure 118. As a result, the test sequence 120a is also replicated. Furthermore, the first application server 112a and the second application server 112b operate within an active-active configuration.

The termination module 206 then receives 408 a second information message comprising a confirmation sequence 208 from the caller 104. The termination module 206 may also receive a termination message with the confirmation sequence 208. The termination message ends the communication session between the caller 104 and the callee 106. The determination module 210 then compares 410 the stored test sequence in the replicated data structure 118 with the confirmation sequence 208. The determination module 210 determines 412 a replication error in response to comparing the stored test sequence in the replicated data structure 118 with the confirmation sequence 208 and the method 400 ends 414.

Figure 5:
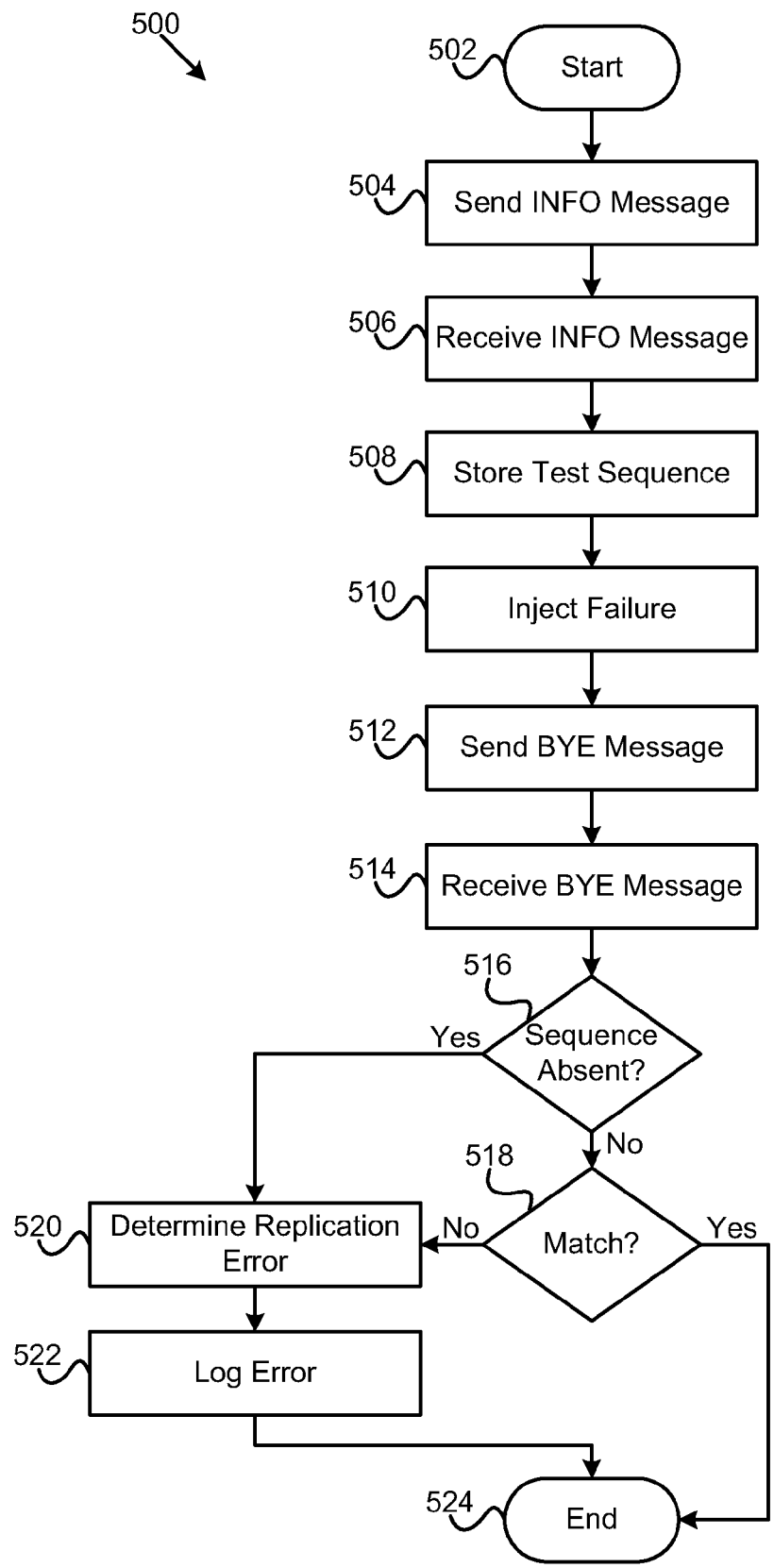
FIG. 5 is a detailed schematic flow chart diagram illustrating another embodiment of a method for validating application server replication errors.

FIG. 5 illustrates another embodiment of a method 500 for validating application server replication errors. The method 500 starts 502 when the message module 108 of a UAC 104 sends 504 a SIP INFO message with a test sequence 120 embedded in the body of the SIP INFO message. Next, the information module 202 receives 506 the SIP INFO message from the UAC 104 with the embedded test sequence 120. The storage module 204 then stores 508 the test sequence 120 in a replicable data structure 116 on a first application server 112a and the replicable data structure 116 is replicated to a second application server 112b to form a replicated data structure 118. The replicable data structure 116 may be an application session object and the replicated data structure 118 may be a replicated application session object. Next, the injection module 304 injects 510 an application server failure that causes the first application server 112a to fail and the second application server 112b to assume management of the communication session.

The UAC 104 sends 512 a SIP BYE message to terminate the communication session between the UAC 104 and the UAS 106. A confirmation sequence 208 is embedded in the SIP BYE message by the message module 108. Next, the termination module 206 receives 514 the SIP BYE message from the UAC 104. The determination module 210 determines 516 that the test sequence 120 is absent from the second application server 112b and determines 520 a replication error. The logging module 302 then may optionally log 522 the replication error in an error log and the method 500 ends 524.

Alternatively, the determination module 210 determines 516 that the test sequence 120 has been replicated to the second application server 112b. The determination module 210 then compares the test sequence 120a in the replicated data structure 118 with the confirmation sequence 208 and determines 518 that the test sequence 120a fails to match the confirmation sequence 208. The determination module 210 determines 520 a replication error and signals the logging module 302 to log 522 the replication error in the error log. Then, the method 500 ends 524. Alternatively, the determination module 210 determines 518 that the test sequence 120b in the replicated data structure 118 and the confirmation sequence 208 match and the method 500 ends 524.

Figure 6:
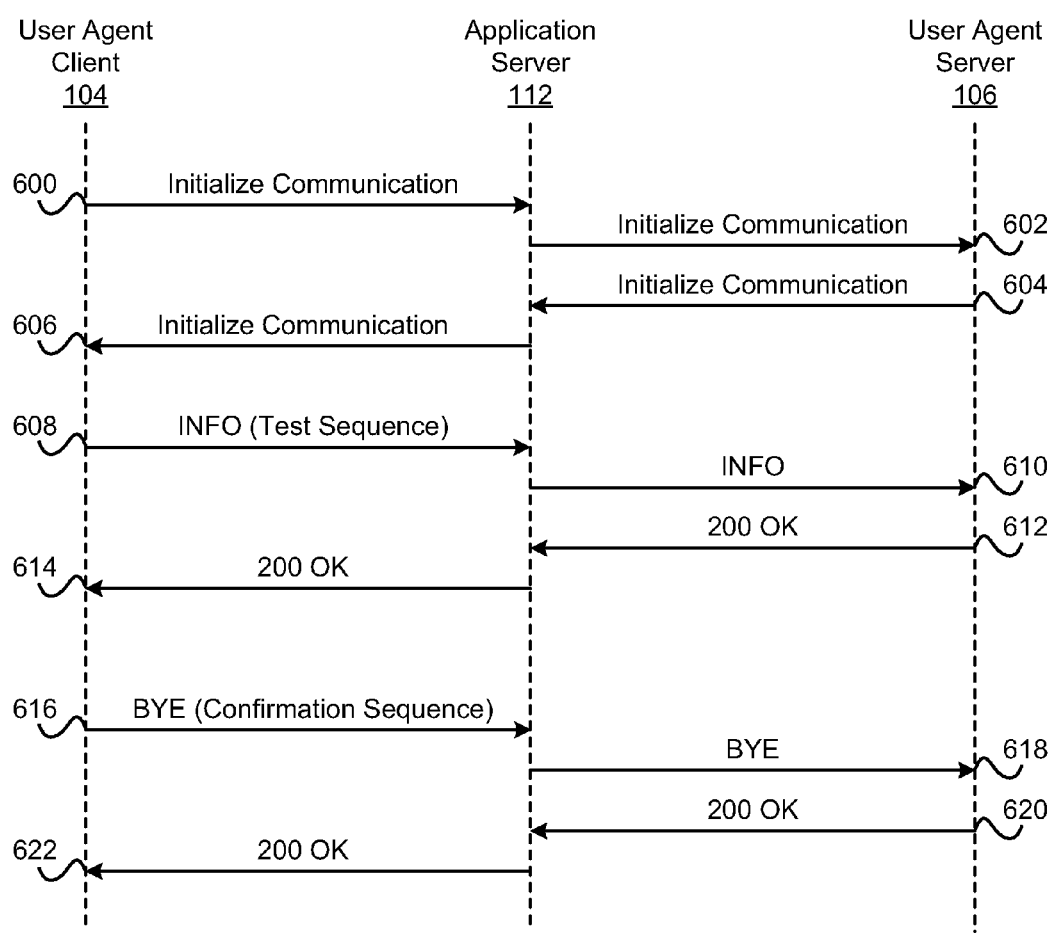
FIG. 6 is a schematic flow chart diagram illustrating one embodiment of SIP call flow according to the present invention.

FIG. 6 illustrates a schematic flow chart diagram illustrating one embodiment of SIP call flow in accordance with the present invention. Specifically, FIG. 6 depicts how the error validation apparatus 122 may use existing SIP methods to validate duplication errors. The UAC 104 sends requests 600 that are routed 602 through the application server 112 to initialize communication. As known by one of ordinary skill in the art, the requests 600 may include an INVITE message, an ACK message, and the like. Likewise the UAS 106 sends responses 604 that are routed 606 through the application server 112 to initialize communication. As also known by one of ordinary skill in the art, these responses may include a variety of "provisional" and "success" messages.

Once the UAC 104 and UAS 106 have established the communication session, the UAC 104 send a SIP INFO message 608 with the test sequence 120 included as described above. The application server 112 may store the test sequence 120 and forward the SIP INFO message 610 to the UAS 106, which responds with a success response 612 routed 614 through the application server 112. Later, the UAC 104 sends a SIP BYE message 616 to terminate the communication session. As discussed above, the SIP BYE message 616 includes the confirmation sequence 208. The application server 112 managing the communication session receives the SIP BYE message 616 with the confirmation sequence 208 and forwards the SIP BYE message 618 to the UAS 106. The UAS 106 sends a success response 620 routed 622 through the application server 112, and the communication session ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for validating application server replication errors, the method comprising:
routing a first information message from a caller to a callee, the first information message comprising a test sequence, the caller engaged in a communication session with callee according to a communication protocol, the communication session managed by a first application server;
storing the test sequence in a replicable data structure on the first application server;
replicating the replicable data structure to a second application server to form a replicated data structure, wherein the first application server and the second application server operate within an active-active configuration;
routing a second information message from the caller to the callee, the second information message comprising a confirmation sequence; and
comparing the stored test sequence in the replicated data structure with the confirmation sequence to determine a replication error.

2. The method of claim 1, further comprising determining the replication error in response to the stored test sequence in the replicated data structure failing to match the confirmation sequence.

3. The method of claim 2, further comprising logging the replication error in an error log in response to the stored test sequence in the replicated data structure failing to match the confirmation sequence.

4. The method of claim 1, further comprising determining the replication error in response to determining that the stored test sequence is absent from the second application server.

5. The method of claim 4, further comprising logging a replication error in an error log in response to determining that the stored test sequence is absent from the second application server.

6. The method of claim 1, further comprising injecting an application server failure configured to cause the first application server to fail, the second application server assuming management of the communication session in response to the first application server failing.

7. The method of claim 1, wherein the communication protocol comprises a Session Initiation Protocol ("SIP") and each of the first application server and the second application server comprise a Back-to-Back User Agent ("B2BUA") application that manages a communication session.

8. A computer program product comprising a computer readable storage medium having computer readable program code to execute operations for validating application server replication errors, the computer program product comprising:
receiving a Session Initiation Protocol ("SIP") INFO message from a user agent client ("UAC"), the SIP INFO message comprising a test sequence, the UAC engaged in a communication session with a user agent server ("UAS") according to SIP, the communication session managed by a first application server, the SIP INFO message transmitted by the UAC in response to a test initiation;
storing the test sequence in a replicable data structure on the first application server, the replicable data structure configured to be replicated to a second application server to form a replicated data structure, wherein the first application server and the second application server operate within an active-active configuration;
receiving a SIP BYE message from the UAC, the SIP BYE message comprising a confirmation sequence and configured to end the communication session between the UAC and the UAS; and
determining a replication error in response to comparing the stored test sequence in the replicated data structure with the confirmation sequence.

9. The computer program product of claim 8, wherein determining a replication error further comprises determining the replication error in response to the stored test sequence in the replicated data structure failing to match the confirmation sequence.

10. The computer program product of claim 9, further comprising logging the replication error in response to the stored test sequence in the replicated data structure failing to match the confirmation sequence.

11. The computer program product of claim 8, wherein determining a replication error comprises determining the replication error in response to determining that the stored test sequence is absent from the second application server.

12. The computer program product of claim 11, further comprising logging a replication error in an error log in response to determining that the stored test sequence is absent from the second application server.

13. The computer program product of claim 8, further comprising injecting an application server failure configured to cause the first application server to fail, the second application server assuming management of the communication session in response to the first application server failing.

14. An apparatus for validating application server replication errors, the apparatus comprising:
an information module configured to receive a Session Initiation Protocol ("SIP") INFO message from a user agent client ("UAC"), the SIP INFO message comprising a test sequence, the UAC engaged in a communication session with a user agent server ("UAS") according to SIP, the communication session managed by a first application server, the SIP INFO message transmitted by a message module in response to a test initiation;
a storage module configured to store the test sequence in an application session object on the first application server, the application session object configured to be replicated to a second application server to form a replicated application session object, wherein the first application server and the second application server operate within an active-active configuration;
a termination module configured to receive a SIP BYE message from the UAC, the SIP BYE message comprising a confirmation sequence and configured to end the communication session between the UAC and the UAS; and
a determination module configured to determine a replication error in response to comparing the stored test sequence in the replicated application session object with the confirmation sequence,
wherein all or a portion of the information module, the storage module, the termination module, and the determination module comprise one or more of logic hardware and computer readable storage media comprising executable code.

15. The apparatus of claim 14, wherein the determination module is further configured to determine the replication error in response to the stored test sequence in the replicated application session object failing to match the confirmation sequence.

16. The apparatus of claim 15, further comprising a logging module configured to log the replication error in an error log in response to the stored test sequence in the replicated application session object failing to match the confirmation sequence.

17. The apparatus of claim 14, wherein the determination module is configured to determine the replication error in response to determining that the stored test sequence is absent from the second application server.

18. The apparatus of claim 17, further comprising a logging module configured to log a replication error in an error log in response to the determination module determining that the stored sequence is absent from the second application server.

19. The apparatus of claim 14, further comprising an injection module configured to inject an application server failure configured to cause the first application server to fail, the second application server assuming management of the communication session in response to the first application server failing.

20. A computer program product comprising a computer readable storage medium having computer readable program code to execute operations for validating Session Initiation Protocol ("SIP") server replication errors, the computer program product comprising:
    receiving a Session Initiation Protocol ("SIP") INFO message from a user agent client ("UAC"), the SIP INFO message comprising a test sequence, the UAC engaged in a communication session with a user agent server ("UAS") according to SIP, the communication session managed by a first application server, the SIP INFO message transmitted by the UAC in response to a test initiation;
    storing the test sequence in an application session object on the first application server, the application session object configured to be replicated to a second application server to form a replicated application session object, wherein the first application server and the second application server operate within an active-active configuration;
    injecting an application server failure configured to cause the first application server to fail, the second application server assuming management of the communication session in response to the first application server failing, wherein the stored test sequence resides on the application session object of the second application server;
    receiving a SIP BYE message from the UAC, the SIP BYE message comprising a confirmation sequence and configured to end the communication session between the UAC and the UAS;
    comparing the stored test sequence in the replicated data structure with the confirmation sequence;
    determining a replication error in response to the comparison of the stored test sequence to the confirmation sequence; and
    logging the replication error in an error log in response to determining the replication error.

* * * * *